UNITED STATES PATENT OFFICE.

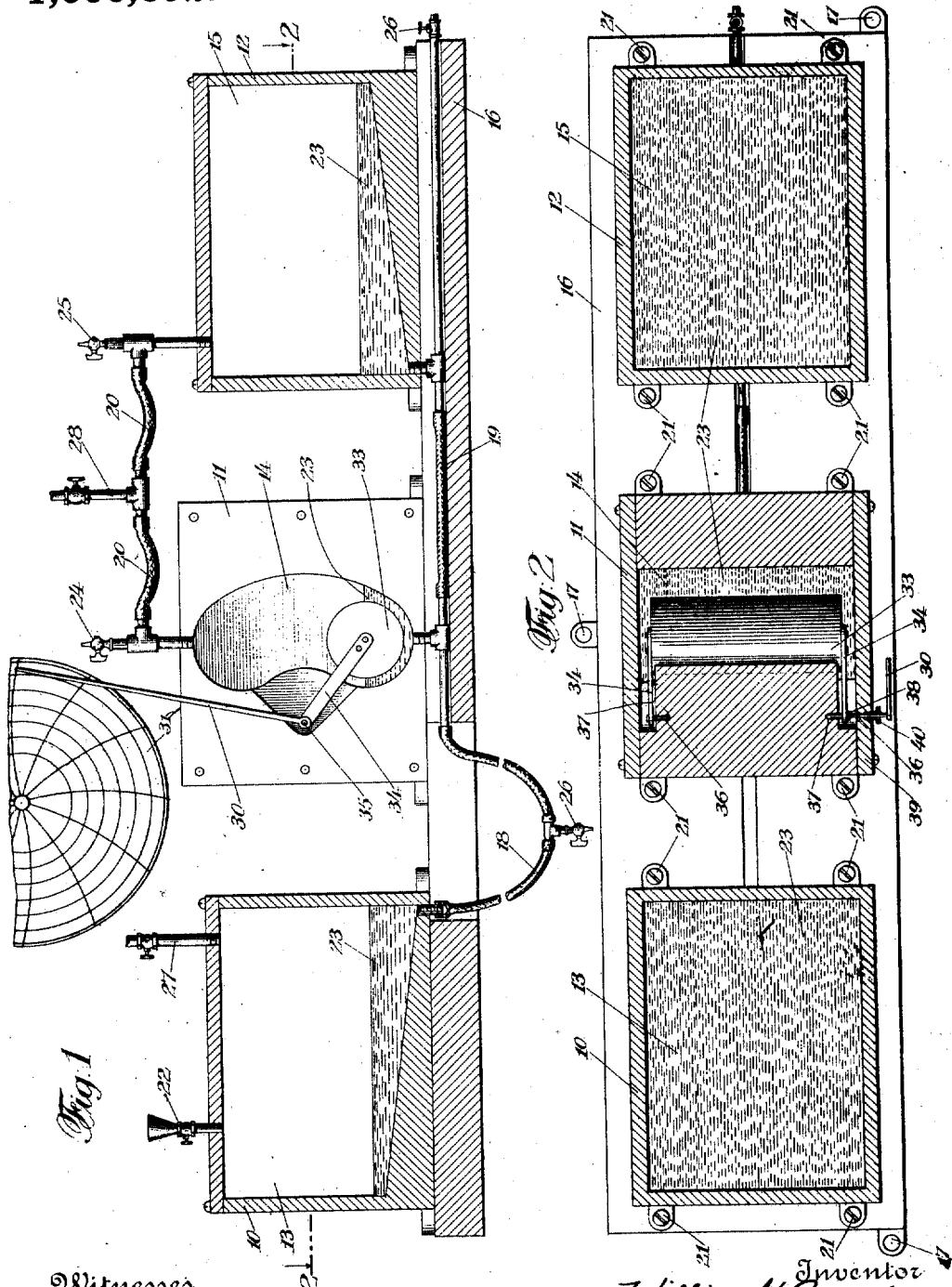

WILLIAM H. BRISTOL, OF WATERBURY, CONNECTICUT.

PRESSURE INDICATING AND RECORDING APPARATUS.

1,000,892.  Specification of Letters Patent.  Patented Aug. 15, 1911.

Application filed November 12, 1910. Serial No. 591,963.

*To all whom it may concern:*

Be it known that I, WILLIAM H. BRISTOL, a citizen of the United States, and a resident of Waterbury, in the county of New Haven and State of Connecticut, have invented certain new and useful Improvements in Pressure Indicating and Recording Apparatus, of which the following is a specification.

My invention relates to indicating and recording apparatus, and particularly to devices of this character whereby differential pressures may be readily indicated or recorded.

It has for its object to provide a differential pressure gage whose indicating and recording arm shall be directly actuated by the rise and fall of a column of a suitable liquid subjected to the opposing pressures.

It has for its further object to so construct the apparatus that the rise and fall of the column of liquid, and the movement of the indicating or recording arm, is made to conform to a particular law, whereby the indications or records of the instrument may be made substantially uniform and express directly some physical quantity. For example, if the apparatus be designed to read in volumes of gas or liquid flowing through a main, the differential pressures established, as by means of a Venturi meter, would ordinarily affect the indications, which correspond to the volume flowing, in such a manner that the same would be proportional to the square root of the differences of pressure established. For equal increase of volume flowing, however, it will be readily understood that such rapid decrease of the indications is extremely objectionable; and to this end suitable provision has been made to regulate the rise and fall of the column of liquid, actuating the indicating or recording means, in such a manner that the rapid increase of pressure does not raise the said column, or affect the indicating arm, proportionally. The conformation of the fluid container or containers is for this purpose suitably altered to permit the column of liquid to follow the law of variation, that is—the column may be made to rise equal amounts for equal volumes flowing, although the differential pressures established thereon increase as the square of the volume; or, the movement of the indicating arm may be suitably controlled, or both.

The nature of my invention will be best understood when described in connection with the accompanying drawings, in which—

Figure 1 is an elevation, partly in section, of the apparatus; and Fig. 2 is a horizontal section taken on the line 2—2, Fig. 1.

Similar characters of reference designate corresponding parts throughout the several views.

Referring now to the drawings, 10, 11 and 12 designate casings forming corresponding pressure chambers 13, 14 and 15, said casings being suitably mounted upon a base 16 which is arranged to be set level by means of leveling screws 17. Suitable pipe connections 18 and 19 are provided between the chambers 13 and 14, and the chambers 14 and 15 respectively, the chambers 14 and 15 being also connected at the top through a suitable pipe connection 20. The various pipes are preferably made so as to be flexible, for the purpose of effecting the initial adjustment of the apparatus which is made with the base 16 perfectly level. In setting up the apparatus at some different place, it is then necessary merely to level the base 16 by means of the leveling screws 17, the pressure chambers, after having once been set properly at the initial adjustment, being secured in place by screws 21 or the like. The chamber 13 may, in effect also, be extended below chamber 14 by lengthening the connection 18 between the same, so that the apparatus may be readily adapted for different total ranges of pressure.

Means, such as the inlet 22 to the pressure chamber 13, are provided for the introduction of a suitable liquid 23 as mercury. This inlet, also, may be employed as a vent; and vents 24 and 25 are, furthermore, provided for the chambers 14 and 15 respectively. Drains 26 are inserted to withdraw the liquid 23 from the apparatus if desired.

27 designates the inlet for the higher pressure, and 28 the inlet for the lower pressure, the difference of which two pressures is to be indicated or recorded. These pressures may be established in various ways, for example—by means of a Pitot tube or a Venturi meter. In the latter case, if the two pressures established by the Venturi meter be employed to determine the volume of fluid flowing through the same, the differences of pressure established thereby will be proportional to the square of the volume flowing. For equal increments of increase of volume, therefore, the differences of increase of pressure established will not be equal, said differences of pressure increasing very rapidly with increase of volume.

It is the purpose of the present invention to so construct the apparatus that although the differences of pressure established by any suitable means may not vary uniformly with variations of the physical quantity being measured, and of which the said differences of pressure are a measure, the ultimate effect of such differences of pressure is uniform. The apparatus for indicating or recording the differences of pressure consists primarily of the casing 10 forming the pressure chamber 13, and the casing 12 forming likewise the pressure chamber 14, the two casings together forming a U-tube apparatus. The latter chamber contains the actuating mechanism for an indicating or recording arm 30, arranged to move over a suitable chart 31 desired, and which chart is rotated in the usual manner by mechanism not shown. The additional casing forming the pressure chamber 15 is merely auxiliary, and its purpose will be hereinafter explained.

The actuating mechanism for the indicating or recording arm 30 consists of a suitable float 33 held by arms 34, and is adapted to move about an axis 35 within the pressure chamber 14, which chamber is preferably curved. The arms 34 are secured to shafts 36 terminating at one end in cones fitting corresponding bearings 37 provided therefor in the casing 11. One of the arms 34 is secured to its shaft by means of a suitable lock nut 38, and the said shaft 36 is extended to pass through the wall 39 of the casing and carries at its outer end the indicating or recording arm 30. The other arm 34 is riveted to its shaft, or otherwise suitably secured thereto. A suitable stuffing box 40 is provided to pass the extended shaft through the wall 39. The indicating or recording arm thus secured to turn with the shaft, consequently partakes of the motion of the cylinder 33 within the chamber 14, as the same rises and falls therein due to the rise and fall of the column of mercury 23 under the influence of the differences of pressure established. The indicating or recording arm being thus directly connected to the actuating means, a small angular movement of the latter will cause an appreciable movement of the former over the chart 31. By locating the initial position of the float 33 above or below the horizontal plane of the axis, the effect produced may be an increasing or decreasing deflection for equal increments of rise of the float.

To provide for the uniform deflection of arm 30 so as to correspond to uniformly increasing increments of the quantity to be measured, but which uniformly increasing increments establish non-uniform differences of pressure as in the example hereinbefore referred to, the conformation of one or both of these chambers 13 and 14 is suitably altered. The alteration of these chambers is such that the amount of liquid forced from one into the other under the varying differences of pressure, varies to suit the particular law governing the establishment of the differences of pressure by the quantity to be measured. For example, in the case hereinbefore referred to, the increasing volume causes a difference of pressure to be established proportional to the square of the volume. Thus, two units of volume will establish a pressure of four; and three units of volume, a pressure of nine. I, therefore, so shape one or more of the chambers or in any manner control the delivery of liquid, for example from the chamber 13, that as the pressure increases thereon less liquid is delivered to the chamber 14 in proportion to the increase of pressure. In the drawings I have indicated this by making the bottom of the chamber 13 inclined; but I do not wish to restrict myself to this particular conformation, as it is evident that the same effect may be obtained in many different ways, the proper conformation being determined by trial. The variation of the movement of the float, due to its angular position, as explained, may be combined with the aforesaid means to obtain the desired result. To distribute the effect produced by altering the conformation of the chambers and to more satisfactorily obtain the same, I prefer to employ the auxiliary chamber 15 which communicates with the chamber 14, and the bottom of which is also inclined. The effect in this chamber, however, is the reverse of that in chamber 13 which is part of the other leg of the U-tube, the liquid rising more slowly, owing to the increased area, upon increase of pressure in the chamber 13. This thus further serves to prevent the rapid rise of liquid in the chamber 14.

I prefer to make the connections between the various chambers flexible, in order that the same may be tilted, if desired, before being fixed, to obtain the proper graduations of the scale over which the arm 30 is adapted to move.

To allow for a greater total range of difference of pressure to be measured by the same apparatus, the chamber 13 may in effect be extended any desired distance below the level of float as by lengthening the connection 18, as shown.

I claim:—

In an apparatus for indicating and recording pressures: a plurality of casings forming communicating pressure chambers adapted to retain a suitable liquid; means contained in one of said chambers, floating on said liquid therein and adapted to partake of the rise and fall of the same; arms secured at one end to said floating means, and at the other end pivotally secured to said casing; an arbor extending from one of said arms and adapted to pass through said casing; and an indicating or recording arm secured to said arbor outside of the said casing.

Signed at New York, in the county of New York, and State of New York this 11th day of Nov. A. D. 1910.

WILLIAM H. BRISTOL.

Witnesses:
 LAURA E. SMITH,
 FREDK. F. SCHUETZ.